July 15, 1947.   W. W. BEMAN   2,423,959
VARIABLE LEVERAGE CONTROL LINKAGE
Filed March 18, 1943   3 Sheets-Sheet 1
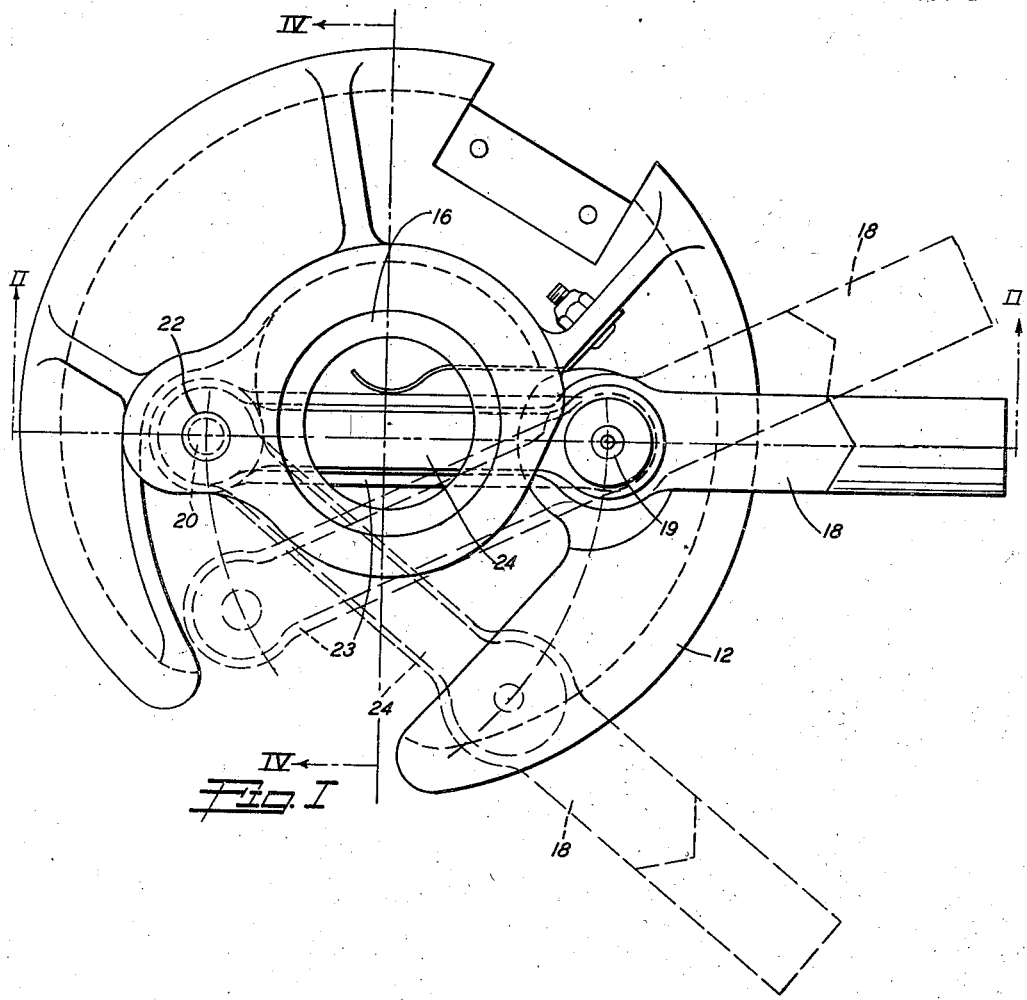
Fig. I
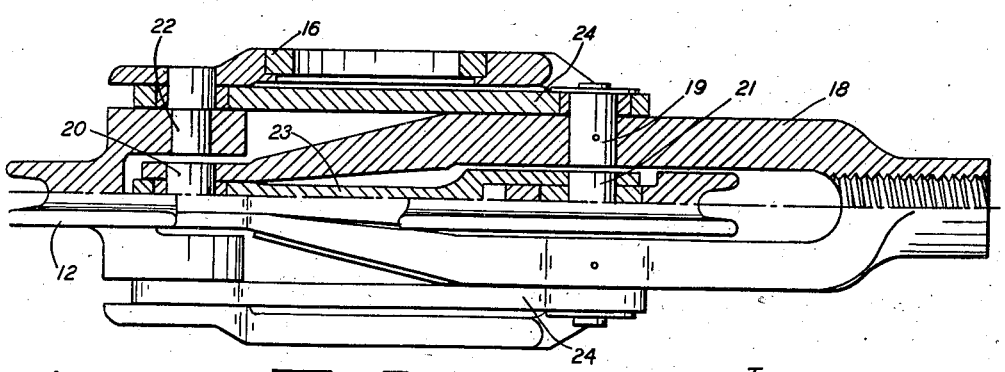
Fig. II
INVENTOR
WARD W. BEMAN
BY George C. Sullivan
AGENT

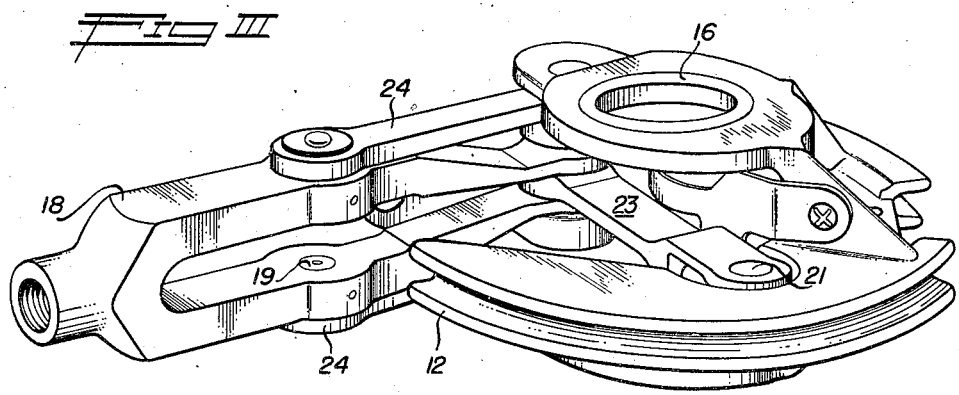
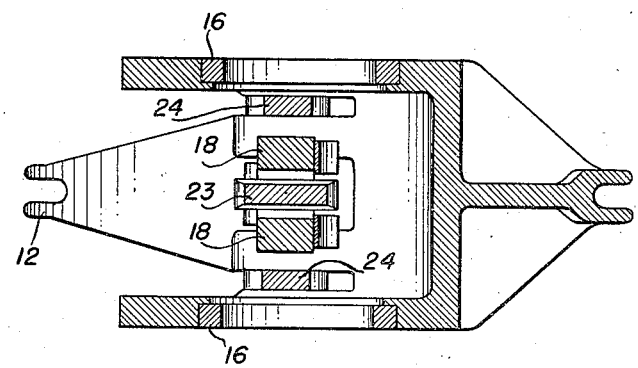

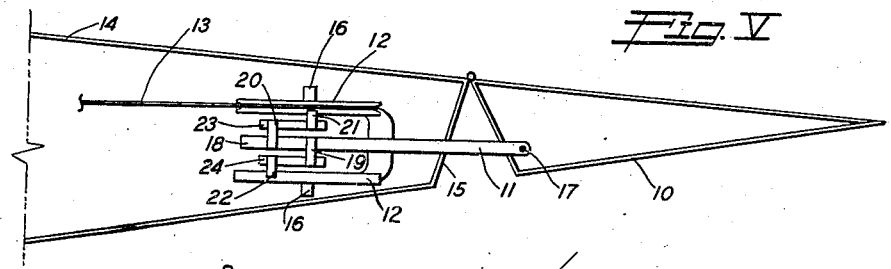
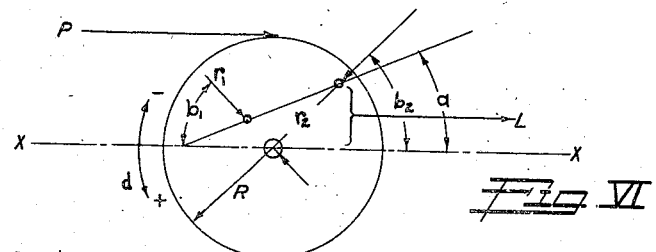
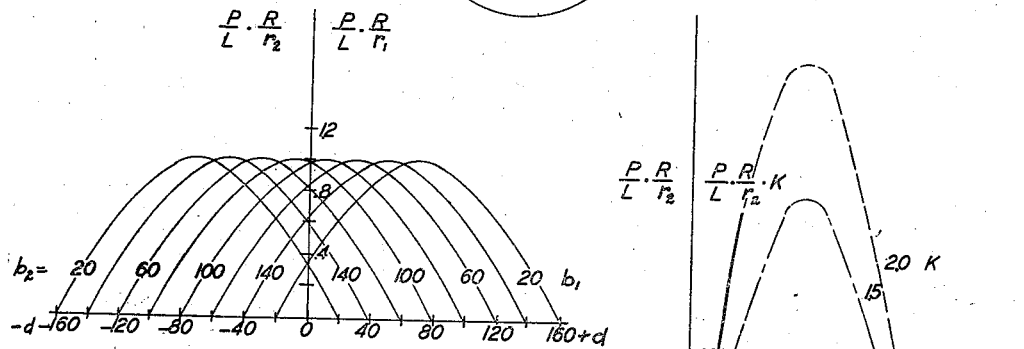
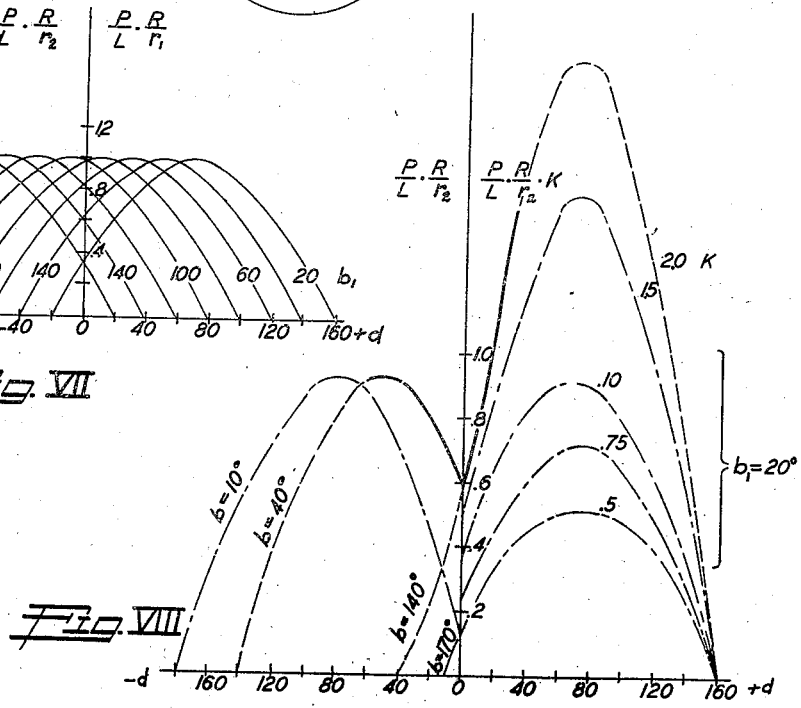
Inventor
WARD W. BEMAN
By George C. Sullivan
AGENT Patented July 15, 1947

2,423,959

UNITED STATES PATENT OFFICE 2,423,959

VARIABLE LEVERAGE CONTROL LINKAGE

Ward W. Beman, Glendale, Calif., assignor to Lockheed Aircraft Corporation, Burbank, Calif.

Application March 18, 1943, Serial No. 479,668

6 Claims. (Cl. 244—90)

This invention relates to an improved variable leverage or mechanical advantage linkage for operating the control surfaces, and other controls or mechanisms, of an airplane.

In a conventional airplane control mechanism, a wheel on a control column is rotated to move the ailerons, and the column itself is tilted forward or back to operate the elevators. Alternately, a stick type of control is tilted transversely to operate the ailerons and longitudinally to operate the elevators. In either case the stick or wheel and column movements are transmitted to the ailerons and elevators by pulley and cable systems, the final or operating pulleys of which have offset crankpins and push rods operating the ailerons and elevators about their hinges. With such a crankpin operating mechanism the mechanical advantage is least at the neutral or mid-position of the control surfaces, so that to obtain sufficient force to operate the surfaces at high speed, the wheel or stick movement must be excessive to secure adequate control at low speeds, since the reaction on the control surfaces due to slight movements thereof at high speeds increases and causes what is commonly called stiffening of the controls, resulting in requiring either excessive stick force at high speed or an unduly limited range of control movements at low speeds if adequate power is available for high speed operation thereof.

In operation of the various control surfaces of an airplane, the full extent of movement of such surfaces is usable and necessary only at low speeds such as occur near the stalling speed of the airplane. In order to adequately control the attitude and movements of the airplane under such conditions, the control surfaces may need to be rapidly swung to one extreme or from one extreme to the other, as such surfaces are relatively ineffective under such conditions. Contrawise, at high speeds the increased air flow and aerodynamic forces acting on the control surfaces renders a slight movement thereof sufficient for control, as an excessive movement would produce too violent a maneuver, with a consequent overloading of the structural elements of the airplane and the control surfaces.

It is accordingly an object of this invention to provide an improved control surface operating mechanism having a variable leverage or mechanical advantage particularly adapted to provide the best compromise between adequate range of control surface movement for low speeds, and sufficiently delicate control for the more limited range of movement required for high speed operation.

Other and further important objects of this invention will be apparent from the disclosures in the specification and the accompanying drawings.

This invention in its preferred form is illustrated in the drawings and hereinafter more fully described.

In the drawings—

Figure I is a plan view of a pulley and rod arrangement illustrative of an embodiment of this invention, wherein the rod is shown in different angular positions relative to the stationary pulley, whereas in practice the pulley may rotate and the rod shift lengthwise.

Figure II is a side view partly sectioned on the line II—II of Figure I.

Figure III is a perspective view of the device with the operating rod shown in the lower dotted line position of Figure I.

Figure IV is a section on the line IV—IV of Figure I.

Figure V is a simplified diagrammatic showing of the use of such a pulley and rod combination to operate an aileron.

Figure VI is a schematic layout of the relationships of the pulley and rod pivots.

Figure VII is a diagram of a series of force curves representative of those obtainable by variations in the pivot radius and locations in Figure VI.

Figure VIII is a diagram of the combined lever arm curves that could be obtained by suitable selection of the location and radius of the pivot points.

As shown—

The disclosed embodiment of the present invention relates to providing a variable leverage control system for operating a control surface such as an aileron 10 through a push and pull rod 11 in turn linked to a terminal pulley 12 operated by a cable 13 remotely operated, as by a conventional control column or stick. The aileron 10 is conventionally hinged to the upper surface of a wing 14 adjacent to the rear beam 15 therein, and the pulley 12 is rotatably supported at 16 within the wing, in a position to operate the push-pull rod 11 which has a mounting point 17 on the aileron to give the desired lever arm at this point. It will be evident from an inspection of Figure V that an outward movement or push on the rod 11 will tilt the aileron upwardly, and a pull will tilt it downwardly. Ordinarily these movements are purposely unequal and the forces required therefor are also unequal and further vary according to flight conditions.

In the pulley and rod combination of Figures I and II the rod 11 of Figure V is threadedly mounted in and forms part of a clevis or fork 18 which is not directly pivoted to the pulley. Two spaced pivot points 19 and 20 are provided on the fork and two pivot points 21 and 22 are provided on the pulley, the sets of pivot points being duplicated on both tines of the fork and on spaced surfaces of the pulley, in order to balance the load on the pulley bearings 16. The diagrammatic view of Figure V omits this duplication for clearness. The fork pivots 20 have a central link 23 connected to the pulley pivot 21, while outside links 24 connect the fork pivots 19 to the pulley pivots 22. By reference to Figures I and V it will be noted that the fork and rod pivot about 19 and 21, which are then aligned, when the pulley rotates clockwise, and about aligned pivots 22 when the pulley rotates counterclockwise from neutral.

In the showing of Figure I, the fork 18 is shown in full lines in its mid or neutral position. In actual operation the fork will reciprocate as the pulley is rotated but to avoid confusion from overlapping lines it is shown as swinging about the stationary pulley into positions corresponding to partial "up" and "down" aileron operations. In the illustrated disclosure the line passing through the pivots 21 and 22 in the pulley is slightly offset relative to the center of the pulley itself, but this is not necessary to the broader aspects of the invention.

Figures VI, VII, and VIII are offered to explain the theory of the illustrated embodiment of a variable leverage system that can be tailored to fit specific operating conditions or forces. Figure VI is a diagrammatic showing of the relationship of the various pivot points. In this figure one pivot point on the pulley is located by $r_1$ which represents the radial distance of said pivot point from the axis about which the pulley turns and $b_1$ which represents the angular distance of the pivot point from the axis $x$—$x$ in a clockwise direction. The other pivot point on the pulley is located by $r_2$ which represents the radial distance of the latter pivot point from the pulley axis and $b_2$ which represents the angular distance of the latter pivot point from the $x$—$x$ axis in a counter-clockwise direction. In this connection it will be noted that the two pivot points referred to correspond respectively to the pivotal connections indicated respectively at 22 and 21 in Figure II, although in the latter figure and in Figure I the two pivot points are shown slightly below the axis corresponding to the $x$—$x$ axis and during angular movements of the pulley in opposite directions move upwardly with respect to said axis instead of upwardly as illustrated diagrammatically in Figure VI. Examples of the various relationships which may exist are as follows wherein:

1. Torque applied to pulley=PR.
2. Load taken out parallel to axis $xx$ is L.
3. The lever centers are $r_1$, $b_1$ and $r_2$, $b_2$.
4. The pulley rotation is defined by $d$ and $d=0$ when the load is transferring from $r_1$, $b_1$ to $r_2$, $b_2$.
5. When $d$ is less than 0 the load is on $r_1b_1$. When $d$ is greater than 0 the load is on $r_2b_2$.

Case I

It is obvious that the following relations exist:

$$PR = Lr_2 \sin(b_2+d); d \text{ is greater than } 0$$

$$PR = Lr_1 \sin(b_1-d); d \text{ is less than } 0$$

These can be put in general form as—

$$\frac{P}{L} = \frac{r_2}{R} \sin(b_2+d); d \text{ is greater than } 0$$

$$\frac{P}{L} = \frac{r_1}{R} \sin(b_1-d); d \text{ is less than } 0$$

Since the transfer of centers occurs when $d$ is zero, a chart can be made which shows—

$$\frac{P}{L} \cdot \frac{R}{r_2} = \sin(b_2+d); d \text{ is greater than } 0$$

and $$\frac{P}{L} \cdot \frac{R}{r_1} = \sin(b_1-d); d \text{ is less than } 0$$

for various values of $b_1$ and $b_2$. Any desired values of $b_1$ and $b_2$ may then be chosen to produce the required operating characteristics. Choosing any desired pair of values for $b_1$ and $b_2$, (say $b_1=20°$ and $b_2=40°$) and calling $$\frac{r_1}{r_2} = k$$

then $$k\frac{R}{r_1} = \frac{R}{r_2}$$

It is apparent that a discontinuity will exist at $d=0$ unless $k$ is chosen so that at $d=0$ $$\frac{P}{L} = \frac{r_2}{R} \sin b_2 = \frac{r_1}{R} \sin b_1$$

i. e.

$$\frac{r_1}{r_2} = \frac{\sin b_2}{\sin b_1} = k$$

If the desired shape of curve $d$ less than 0 is known, the value of $b_2$ can be obtained from the left side of Figure VII. If the desired shape of curve for $d$ greater than 0 is known, the value of $b_1$ is selected from the right hand side of Figure VII.

If it is desired not to have a discontinuity in the ratio P/L when $d=0$, then the ratio $$k = \frac{r_1}{r_2}$$

can be selected so that $$k = \frac{\sin b_2}{\sin b_1}$$

Obviously, any portion of the total range for $d$ can be used. In Figure VI for example, the operating range, or pulley angle $d$, may cover 30° one way, and 45° the other way, as illustrated in Figure I, since an aileron, for example, may have an operating range of 8° up and 24° down, and the forces required for such movement are not alike. Also, the actual aileron or other control surface movements have no direct relationship to the pulley rotation, although responding thereto in proportion to the overall mechanical advantage developed through the pulley and rod connection to the lever arm on the control surface itself.

The P/L relation can and generally will be further modified by applying P by means of a crank instead of a pulley, and by allowing the L axis to rotate instead of remaining parallel to the $xx$ axis (reference Figure VI).

If the pivotal direction is reversed so that the lever pivots towards the center from the transfer point then the analysis is as follows:

Case II

It is obvious that the following conditions exist—

$$PR = Lr_2 \sin(b'_2+d); d \text{ is less than } 0$$

$$PR = Lr_1 \sin(b'_1-d); d \text{ is greater than } 0$$

This condition is covered, however, in Case I where $$b_2' = (180-b_2)$$
$$b_1' = (180-b_1)$$

In Case II the rod will reciprocate out and back while the pulley rotates between limits in one direction. Accordingly, such an arrangement will be especially suited to operating various mechanisms other than control surfaces.

In practice, it will be evident from the foregoing that the mechanical advantage for the upward part of the control surface movement may be different from and may cover a different range, than for the downward part of the movement, and that in each case the control near the neutral point is made sufficiently responsive to obtain adequate control when minor movements of the control surface are all that are required, as at high speeds, yet the full range of control surface movement is obtainable at low speeds without an excessive movement of the controls at the operating or pilot's station.

While the foregoing pulley and rod linkage will desirably have unequal ranges for the up and down movements of ailerons, elevators and perhaps flaps; in the case of rudder controls and trim tabs, the movements will be equal in extent and leverage unless special consideration of engine torque or the like requires an excessive rudder movement or leverage in one direction. For example, control surface tabs may have an operating lever pivoted at two fixed points so that the lever will pivot about a fixed "pulley," as shown in Figure I, to increase the relative angular movement of the tab relative to the control surface as the latter is moved away from neutral.

If it is desirable to reverse the mechanical advantage of the foregoing described system it is possible to apply the operating force to the push-pull rod, thus in effect inverting the leverage curves.

It will thus be seen that I have invented an improved and self-contained variable leverage system for operating airplane controls and other types of mechanisms wherein the desired mechanical advantage varies over a wide range, whereby the variable leverage system of this invention can be used to give a delicate and responsive control within a narrow range while maintaining a workable control for the maximum range without requiring excessive movements at the control station. Thus by tailoring the variable leverage system to fit the operating loads on the control surface or other mechanism, a substantially uniform effort can be exerted at the operating station without excessive movements of the controls.

Having thus described my invention and the present preferred embodiments thereof, I desire to emphasize the fact that many modifications may be resorted to in a manner limited only by a just interpretation of the following claims.

I claim as my invention:

1. A variable leverage airplane control system including an airplane control surface wherein such control surface is remotely actuated by a transmission system actuated from a central point, said leverage system comprising a rotatable member movable in step with the actuating motion at said central point in response to energy transmitted thereto by said transmission system, and operating means connecting said rotatable member to said control surface for pivotally moving the same in opposite directions from a neutral point, said means including a plurality of pivoted linkages between the rotatable member and the balance of the operating means, said pivoted linkages being so constructed and arranged as to transfer the operating load from one linkage to another at the neutral point whereby to vary the mechanical advantage of said operating means over its range of operation.

2. A variable leverage airplane control system including an airplane control surface or the like wherein such control surface is remotely actuated by a transmission system actuated from a central point, said leverage system comprising a movable member associated with said transmission system and having equal ranges of movement in opposite directions from a neutral point, an operating member for said control surface, means providing two dissimilar connections between said operating member and said movable member, one of which connections is operable in one direction of the movable member from a neutral point and the other is operable in the opposite direction from said neutral point, whereby to produce asymmetrical mechanical advantage linkages approximating the varying operating load characteristics of the control surface when moved away from a neutral point corresponding to the neutral point of the movable member.

3. A variable leverage airplane control system including an airplane control surface or the like wherein such control surface is remotely actuated by a transmission system actuated from a central point, said leverage system comprising an oscillatable member forming the terminus of said transmission system, a push-pull operating mechanism for operating said control surface, two asymmetrical variable leverage linkages operatively connecting said push-pull mechanism to said oscillatable member, and means interconnecting said linkages so constructed and arranged as to render said linkages selectively operative by opposite movements of said member from its neutral position.

4. A variable leverage airplane control system including an airplane control surface or the like which is required to pivot either way to an unequal extent from a neutral point, said leverage system comprising a control member uniformly movable in either direction from a neutral point, operating mechanism for said control surface including a push-pull rod having a lever arm connection to said control surface, two dissimilar linkages between said push-pull rod and said control member and means interconnecting said dissimilar linkages so that said linkages may be rendered selectively operative whereby to vary the mechanical advantage applied to said push-pull rod when operating the control surface in opposite directions from its neutral point.

5. A variable leverage airplane control system including an airplane control surface or the like which is required to pivot either way to an unequal extent from a neutral point, said leverage system comprising a control member uniformly movable in either direction from a neutral point, operating mechanism for said control surface including a push-pull rod having a lever arm connection to said control surface, two dissimilar linkages between said push-pull rod and said control member, and means interconnecting said linkages, said linkages being arranged to pivot about different axes relative to the control member and push-pull rod whereby different and variable mechanical advantages are provided for the operation of the control surface in opposite directions from its neutral point.

6. A variable leverage control system for simultaneously pivoting a pair of movable control surfaces in opposite directions from their neutral positions, including simultaneously rotatable members positioned adjacent the movable control surfaces, master links connecting said rotatable members to their control surfaces, and a plurality of pivotal connections between each master link and its rotatable member, said pivotal connections being arranged to provide asymmetrical mechanical advantages between the control surfaces and the corresponding rotatable members, which asymmetrical mechanical advantages are transposed as the control surfaces move in opposite directions through their neutral points.

WARD W. BEMAN.

REFERENCES CITED

The following references are of record in the file of this patent:

UNITED STATES PATENTS

| Number | Name | Date |
|---|---|---|
| 1,036,916 | Seaman | Aug. 27, 1912 |
| 1,547,133 | Strickland | July 21, 1925 |
| 1,667,842 | Coykendall | May 1, 1928 |
| 1,806,432 | Upson | May 19, 1931 |
| 1,216,577 | Lang | Feb. 20, 1917 |
| 2,193,554 | Dale | Mar. 12, 1940 |
| 2,338,379 | Henke | Jan. 4, 1944 |
| 2,007,707 | Dodge | July 9, 1935 |

FOREIGN PATENTS

| Number | Country | Date |
|---|---|---|
| 80,866 | Germany | Apr. 30, 1895 |
| 761,781 | France | Jan. 13, 1934 |
| 849,251 | France | Aug. 11, 1939 |
| 199,399 | Great Britain | June 15, 1923 |
| 409,550 | France | Feb. 19, 1910 |